(12) United States Patent
Kato et al.

(10) Patent No.: US 6,879,847 B1
(45) Date of Patent: Apr. 12, 2005

(54) SYSTEMS AND METHODS FOR DISPLAYING A MESSAGE ON A MOBILE COMMUNICATION DEVICE

(75) Inventors: Shuzo Kato, San Diego, CA (US); Yutaka Togashi, San Diego, CA (US)

(73) Assignee: Mitsubishi Electric Corporation, Amagasaki (JP)

( * ) Notice: Subject to any disclaimer, the term of this patent is extended or adjusted under 35 U.S.C. 154(b) by 636 days.

(21) Appl. No.: 09/829,661

(22) Filed: Apr. 9, 2001

(51) Int. Cl.$^7$ ................................................ H04M 1/00
(52) U.S. Cl. ...................... 455/566; 455/418; 340/7.41
(58) Field of Search .................................. 455/566, 418, 455/419, 420; 340/7.41, 7.52, 7.55, 7.56; 709/221

(56) References Cited

U.S. PATENT DOCUMENTS

| | | | |
|---|---|---|---|
| 5,726,639 A | 3/1998 | Romero et al. | 340/825.22 |
| 5,887,254 A * | 3/1999 | Halonen | 455/419 |
| 6,047,071 A | 4/2000 | Shah | 380/273 |
| 6,088,457 A | 7/2000 | Parkinson et al. | 380/270 |
| 6,122,503 A | 9/2000 | Daly | 455/419 |
| 6,144,849 A | 11/2000 | Nodoushani et al. | 455/419 |
| 6,434,484 B1 * | 8/2002 | Lee | 701/213 |

* cited by examiner

Primary Examiner—Lee Nguyen
(74) Attorney, Agent, or Firm—Oblon, Spivak, McClelland, Maier & Neustadt, P.C.

(57) ABSTRACT

A mobile communication device includes a memory and a display. The mobile communication device is configured to display a message on the display whenever the mobile communication device is powered on and while the mobile communication device is refreshing the memory. The mobile communication device includes a transceiver and can be configured to receive an automated download of a new message through the transceiver.

16 Claims, 2 Drawing Sheets

SYSTEMS AND METHODS FOR DISPLAYING A MESSAGE ON A MOBILE COMMUNICATION DEVICE

BACKGROUND OF THE INVENTION

1. Field of the Invention

The invention relates generally to mobile communications and more particularly to systems and methods for displaying a message on a mobile communication device.

2. Background

Most mobile communication devices today comprise a flash memory that stores boot code, used to boot up the mobile communication device, program code used to run the mobile communication device, and data used by the programming code. When the mobile communication device is powered on it must refresh the flash. The time required to refresh the flash depends on the size of the flash memory; however, as mobile communication devices incorporate more and more functions, the size of the program code and the amount of data stored in the flash increases. As a result, today's mobile communication devices often include large flash memories that can take as long as 5 seconds to refresh.

When a user turns on their mobile communication device there is a delay, while the flash is refreshed. If the refresh period is too long, the user may become frustrated. Therefore, it would be useful to display, on the mobile communication device, something the user would enjoy seeing or reading during the refresh period. Typically, mobile communication devices display the wireless service provider's logo during the refresh period. But the service provides logo is not very enjoyable to look at.

SUMMARY OF THE INVENTION

The systems and methods for displaying a message on a mobile communication device provide a method for displaying a message to the user during the flash refresh period. For example, the message could be the user's horoscope. In order to avoid storing lots of messages on the mobile communication device, a server connected to the wireless communication system in which the mobile communication device is operating can be used to download a new message to the device each day. In order to target the message to the user, the mobile communication device can be configured to accept user input, such as the user's birth date. The mobile communication device can transmit this information to the server, and the server can automatically select and download a new message based on the user input.

As such, there is provided a mobile communication device comprising a memory, and a display. The mobile communication device is configured to display a message on the display whenever the mobile communication device is powered on and while the mobile communication device is refreshing the memory.

In one aspect of the invention, the mobile communication device further comprising a transceiver, and the mobile communication device is configured to periodically receive an automated download of a new message through the transceiver.

In another aspect of the invention, the mobile communication device further comprises a user interface, and the mobile communication device is configured to accept user input through the user interface. The user input is used to select and/or construct the message that will be displayed.

There is also provided a server comprising a message database. The message database is configured to store a plurality of messages, and the server is configured to automatically download one of the plurality of messages to a mobile communication device each day.

Other aspects, advantages and novel features of the invention will become apparent from the following Detailed Description of Preferred Embodiments, when considered in conjunction with the accompanying drawings

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Although the following discussion relates general to mobile phones, it will be apparent that the systems and methods described herein will work equally well with any mobile communication device. For example, the systems and methods for displaying a message on a mobile communication device will work with portable computers or Personal Digital Assistants (PDAs) that are equipped with wireless transceivers for communication with a wireless communication system. Therefore, the use of mobile phones in the following description is by way of example only.

Figure 1:
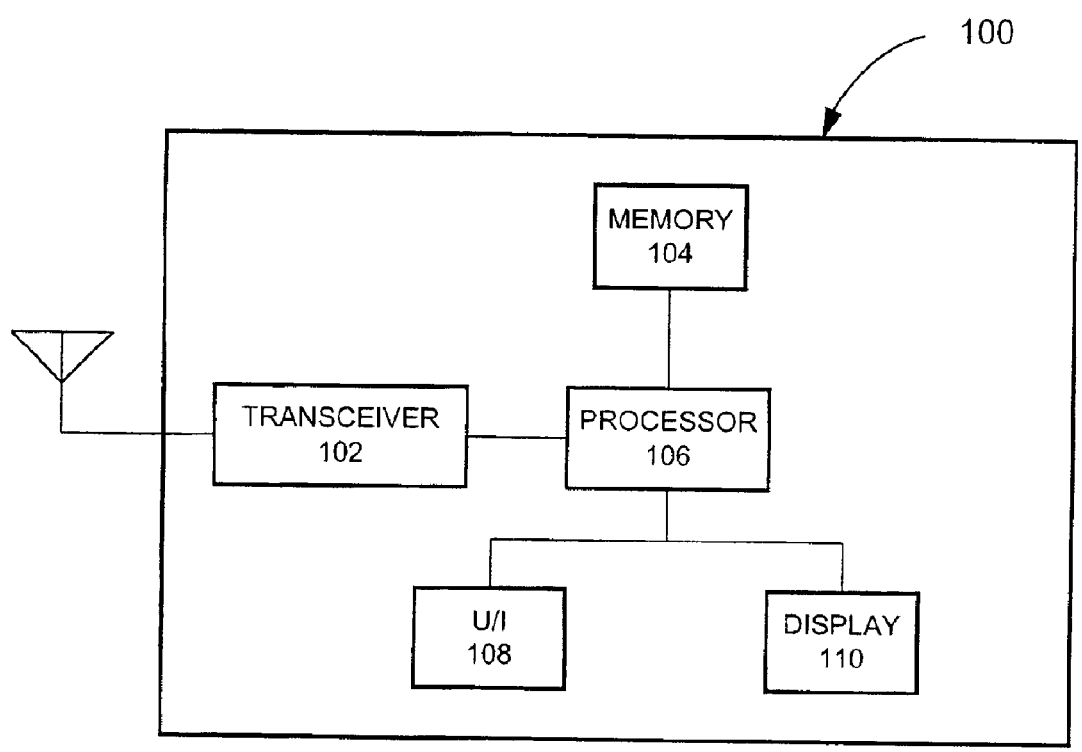
FIG. 1 is a block diagram illustrating an example embodiment of a mobile communication device in accordance with the invention.

FIG. 1 illustrates an example mobile communication device 100 in accordance with one embodiment of the systems and methods for displaying a message on a mobile communication device. Device 100 includes processor 106 that is configured to control the operation of device 110, and a transceiver 102 that is controlled by processor 106 and that is configured to communicate with a wireless communication system. Device 100 also includes a user interface 108, which preferably comprises a keyboard and other function keys, and a display 110.

Further, device 100 comprises memory 104, which is configured to store boot code, used to boot up device 100, program code used by processor 106 to run device 100, and data used by the programming code. Preferably, memory 104 comprises a Flash memory. Flash memory is a type of Electrically Erasable Programmable Read Only Memory (EEPROM). It is commonly used in digital cameras, mobile phones, and personal computers. Additionally, Memory 104 preferably includes a Random Access Memory (RAM) (not shown) for temporary storage of code and data.

When device 100 is first powered on, it must refresh memory 104. The time required to refresh memory 104 depends on the size of the memory. But as mobile communication devices incorporate increased functionality, the size of the program code and data is increased as well. Therefore, the size of memory 104 must also increase. As a result, it can take as long as 5 seconds to refresh memory 104.

When device 100 is first powered on, the logo for the provider of wireless communication service to device 100 is typically displayed on display 110, while memory 104 is being refreshed. But there is typically nothing entertaining about the logo. So, if the refresh delay is too long, a user of device 100 may become frustrated and impatient.

In the systems and methods for displaying a message on a mobile device a message is displayed on display 110 during the refresh period instead of a logo. For example, the message could be a horoscope. Alternatively, mobile device 100 can display a daily fortune or some other type of message or saying. Further, if mobile device 100 is configured to display graphics, then the message can combine a graphic image as well. For example, device 100 can display a comic strip such as Doonsbury™. Doonsbury™ is the perfect type of comic strip, because it is one frame consisting of a simple picture and a few lines of text. Therefore, the user will have time to read the comic during the refresh period.

Because the size of memory 104 is limited, however, it is not desirable for device 100 to store a lot of messages. Preferably, device 100 only stores one message at a time. For example, device 100 can be configured to store one message that is displayed on display 110 each time device 100 is powered on in a given day. At the end of the day, device 100 can receive, through transceiver 102, a new message for the next day. For example, if the messages displayed to the user are horoscopes, then a new horoscope can be received and displayed each day.

Figure 2:
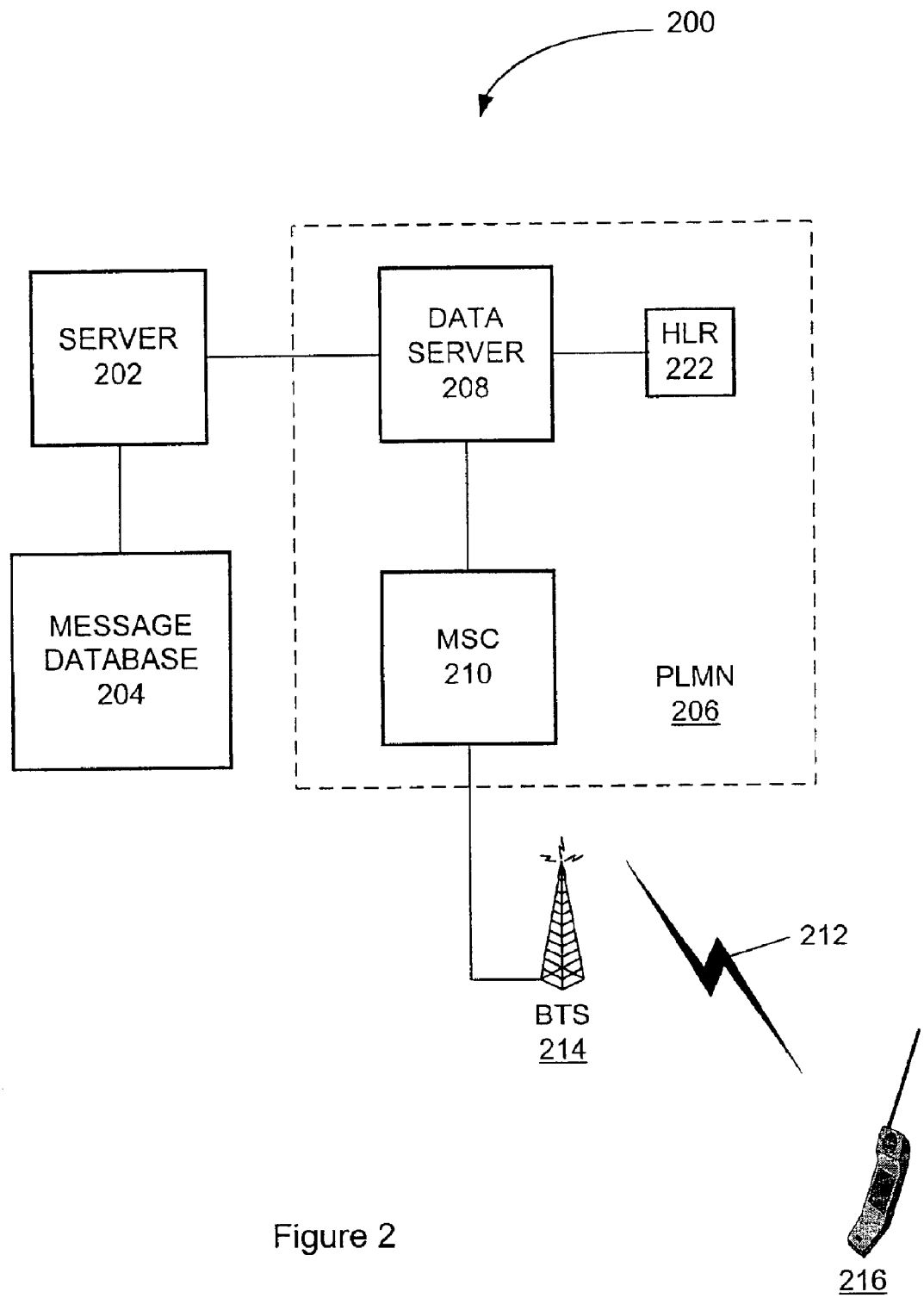
FIG. 2 is a block diagram illustrating an example embodiment of a system for directly downloading content to a mobile device in accordance with the invention.

FIG. 2 illustrates a system 200 in which periodic downloads of new messages to a mobile communication device 200 can be accomplished in accordance with the systems and methods for displaying a message on a mobile communication device. System 200 comprises a server 202 and a message database 204. Server 202 is interfaced with a Public Land Mobile Network (PLMN) 206. PLMN 206 communicates with a plurality of mobile devices over a plurality of communication channels of which device 216 and channel 212 serve as examples.

Preferably, server 202 periodically selects a message from database 204 and sends the message to device 216 through PLMN 206. This comprises sending the message to data server 208, which is responsible for encoding the message in accordance with the data service employed by PLMN 206. For example, a common messaging date service is the Short Message Service (SMS). If PLMN 206 implements SMS for data communications with device 216, then data server 208 can be a short message service center.

As such, data server 208 will be responsible for encapsulating the message into an appropriate packet message format. Data server 208 then ascertains the current location of device 216 by interrogating Home Location Register (HLR) 222 and routes the packet message to a Mobile Switching Center (MSC) 210 serving device 216 at its current location. MSC 210 then pages device 216 and establishes a connection with device 216 via Base Transceiver Station (BTS) 214 over communication channel 212. Once the connection is established, MSC 210 encapsulates the packet message into an SMS message and downloads the message to device 216 over channel 212.

PLMN 206 can use SMS data service as discussed above; however, other data services can be used depending on, for example, the type of communication protocol implemented by PLMN 206. Thus, system 200 can implement such data services as GPRS, HSCSDS, or EDGE services, to name a few.

Preferably, device 216 is configured to allow the user to input information into device 216, using a user interface such as user interface 108, that can be used to customize the message for the user. For example, if the message is a horoscope, then preferably the user can input the user's birth date into device 216. Device 216 preferably can transmit this information to MSC 210, which can then forward the information to server 202. Server 202 can then select the appropriate horoscope from database 204 and automatically download a new horoscope to device 216 each day. Thus, when the user powers on device 216 each day, the user will be able to view the appropriate horoscope for that day.

Information input by the user can be used to target other types of messages to the user as well. For example, the user can input comic strip preferences, or even select what type of message the user would like to receive.

Preferably, server 202 automatically downloads the new horoscope, or other new message, at an off peak operation time for the communication system and at a time when the user is less likely to be using the mobile device. For example, server 202 is preferably configured to automatically download the new horoscope late at night or early in the morning.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A mobile communication device, comprising:
   a memory configured to store code and data;
   a display; and
   a transceiver,
   wherein the mobile communication device displays a new message when the mobile communication device is powered on and while the mobile communication device is refreshing the memory,
   the new message is responsive to a user input, and
   the mobile communication device periodically, at least once per a predetermined period, receives an automated download of the new message through the transceiver.

2. The mobile communication device of claim 1, further comprising a user interface,
   wherein the mobile communication device is configured to accept the user input through the user interface, and
   the user input is used to select and/or construct the message.

3. The mobile communication device of claim 1, wherein the new message is a horoscope.

4. The mobile communication device of claim 1, wherein the new message is a fortune.

5. The mobile communication device of claim 1, wherein the new message is a comic strip.

6. A server, comprising:
   a message database configured to store a plurality of messages,
   wherein the server periodically, at least once per a predetermined period, transmits an automated download of a new message to a mobile communication device configured to display the new message,
   the new message is responsive to user input, and
   the new message is displayed when the mobile communication device is powered on and while the mobile communication device is refreshing memory.

7. The server of claim 6, wherein the new message is a horoscope.

8. The server of claim 6, wherein the new message is a fortune.

9. The server of claim 6, wherein the new message is a comic strip.

10. A wireless communication system, comprising:

a server including a message database configured to store a plurality of messages; and a mobile communication device including,
a transceiver,
a memory, and
a display, wherein the mobile communication device displays a new message when the mobile communication device is powered on and while the mobile communication device is refreshing the memory, the new message is responsive to a user input, and the server periodically, at least once per a predetermined period, transmits an automated download of one of the plurality of messages to the mobile communication device.

11. The wireless communication system of claim 10, wherein the mobile communication device further comprises a user interface, wherein the mobile communication device is configured to accept the user input through the user interface and to communicate the user input to the server via the transceiver.

12. The wireless communication system of claim 11, wherein the server is configured to use the user input to select and/or construct the new message downloaded to the mobile communication device each day.

13. A mobile communication device, comprising:

storage means for storing code and data;

display means for displaying a new message; and transceiver means for transmitting/receiving the new message and user input, wherein the mobile communication device displays the new message on the display means when the mobile communication device is powered on and while the mobile communication device is refreshing the storage means, the new message is responsive to the user input, and the mobile communication device periodically, at least once per a predetermined period, receives an automated download of the new message through the transceiver means.

14. The mobile communication device of claim 13, further comprising input means for inputting user input, wherein the mobile communication device is configured to accept the user input through the input means, and the user input is used to select and/or construct the new message.

15. A server, comprising:

storage means for storing a plurality of new messages; and transmission means for periodically transmitting, at least once per a predetermined period, an automated download of a new message to a mobile communication device configured to display the new message, wherein the new message is responsive to user input, and the new message is displayed when the mobile communication device is powered on and while the mobile communication device is refreshing memory.

16. The server of claim 15, wherein the server is configured to receive information about a user of the mobile communication device and to use the information to select and/or construct the new message downloaded to the mobile communication device each day.

* * * * *